US012214633B1

(12) United States Patent
Jefferies

(10) Patent No.: US 12,214,633 B1
(45) Date of Patent: Feb. 4, 2025

(54) TRAILER HITCH WITH LIFT MECHANISM

(71) Applicant: Allen Jefferies, Granbury, TX (US)

(72) Inventor: Allen Jefferies, Granbury, TX (US)

( * ) Notice: Subject to any disclaimer, the term of this patent is extended or adjusted under 35 U.S.C. 154(b) by 338 days.

(21) Appl. No.: 17/730,389

(22) Filed: Apr. 27, 2022

Related U.S. Application Data

(60) Provisional application No. 63/180,999, filed on Apr. 28, 2021.

(51) Int. Cl.
B60D 1/46 (2006.01)
B60D 1/06 (2006.01)

(52) U.S. Cl.
CPC .............. B60D 1/465 (2013.01); B60D 1/06 (2013.01)

(58) Field of Classification Search
CPC .................................. B60D 1/46; B60D 1/465
See application file for complete search history.

(56) References Cited

U.S. PATENT DOCUMENTS

| 3,554,578 A | 1/1971 | Reed | |
|---|---|---|---|
| 5,401,047 A | 3/1995 | Dettling, Jr. | |
| 5,560,628 A * | 10/1996 | Horn | B60P 3/125 280/490.1 |
| 6,003,892 A * | 12/1999 | Henson | B60D 1/465 254/420 |
| 6,585,280 B1 * | 7/2003 | Wiers | B60D 1/44 280/468 |
| 6,634,666 B2 | 10/2003 | Shilitz | |
| 9,469,171 B2 * | 10/2016 | Morga | B60D 1/06 |
| 9,840,120 B1 * | 12/2017 | Alhazza | B60D 1/46 |
| 9,889,714 B2 | 2/2018 | Bochenek et al. | |
| 10,252,590 B2 | 4/2019 | Jackson et al. | |
| 2003/0222426 A1 | 12/2003 | Rosenlund | |
| 2004/0084877 A1 | 5/2004 | Smith | |
| 2005/0062257 A1 * | 3/2005 | Donze | B60D 1/44 280/490.1 |
| 2008/0315557 A1 | 12/2008 | Stanifer et al. | |
| 2017/0136836 A1 | 5/2017 | Davis | |

FOREIGN PATENT DOCUMENTS

| DE | 102017128586 A1 | 8/2020 | |
|---|---|---|---|
| EP | 1477339 A1 * | 11/2004 | B60D 1/46 |
| EP | 3581008 A1 * | 12/2019 | |

* cited by examiner

Primary Examiner — Kevin Hurley
(74) Attorney, Agent, or Firm — James E. Walton

(57) ABSTRACT

A trailer hitch with lift mechanism includes a vehicle connection point, an adjustable hitch base, a motor, and a hitch locking assembly. The motor is powered via a trailer hitch plug of a towing vehicle. The adjustable hitch base includes a plurality of adjustment apertures and one or more guide tracks. The hitch locking assembly is slidingly coupled to the adjustable hitch base and includes one or more guide rollers slidingly associated with the guide tracks, a backing plate, an aperture configured to receive a ball, and one or more adjustment locking devices. Rotation of the drive shaft causes the hitch locking assembly to move relative to the adjustable hitch base.

5 Claims, 10 Drawing Sheets

TRAILER HITCH WITH LIFT MECHANISM

This application claims the benefit of U.S. Provisional Application No. 63/180,999, filed 28 Apr. 2021, titled "Trailer Hitch with Lift Mechanism," which is incorporated by reference herein for all purposes.

BACKGROUND

1. Field of the Invention

The present invention relates in general to the field of trailer hitches.

2. Description of Related Art

Currently, there are adjustable trailer hitches with which the user can manually adjust the height of the ball relative to the receiver shaft. These hitches have a vertical shaft with multiple adjustment apertures. The user selects the desired height of the ball and places one or more pins in the shaft to set the height of the ball. There are also electric tongue jacks that can be used to raise and lower the height of the tongue on a trailer or other towed vehicle.

Although great strides have been made in the area of trailer hitches, many shortcomings remain.

DESCRIPTION OF THE DRAWINGS

The novel features believed characteristic of the embodiments of the present application are set forth herein. However, the embodiments themselves, as well as a preferred mode of use, and further objectives and advantages thereof, will best be understood by reference to the following detailed description when read in conjunction with the accompanying drawings, wherein.

Figure 1:
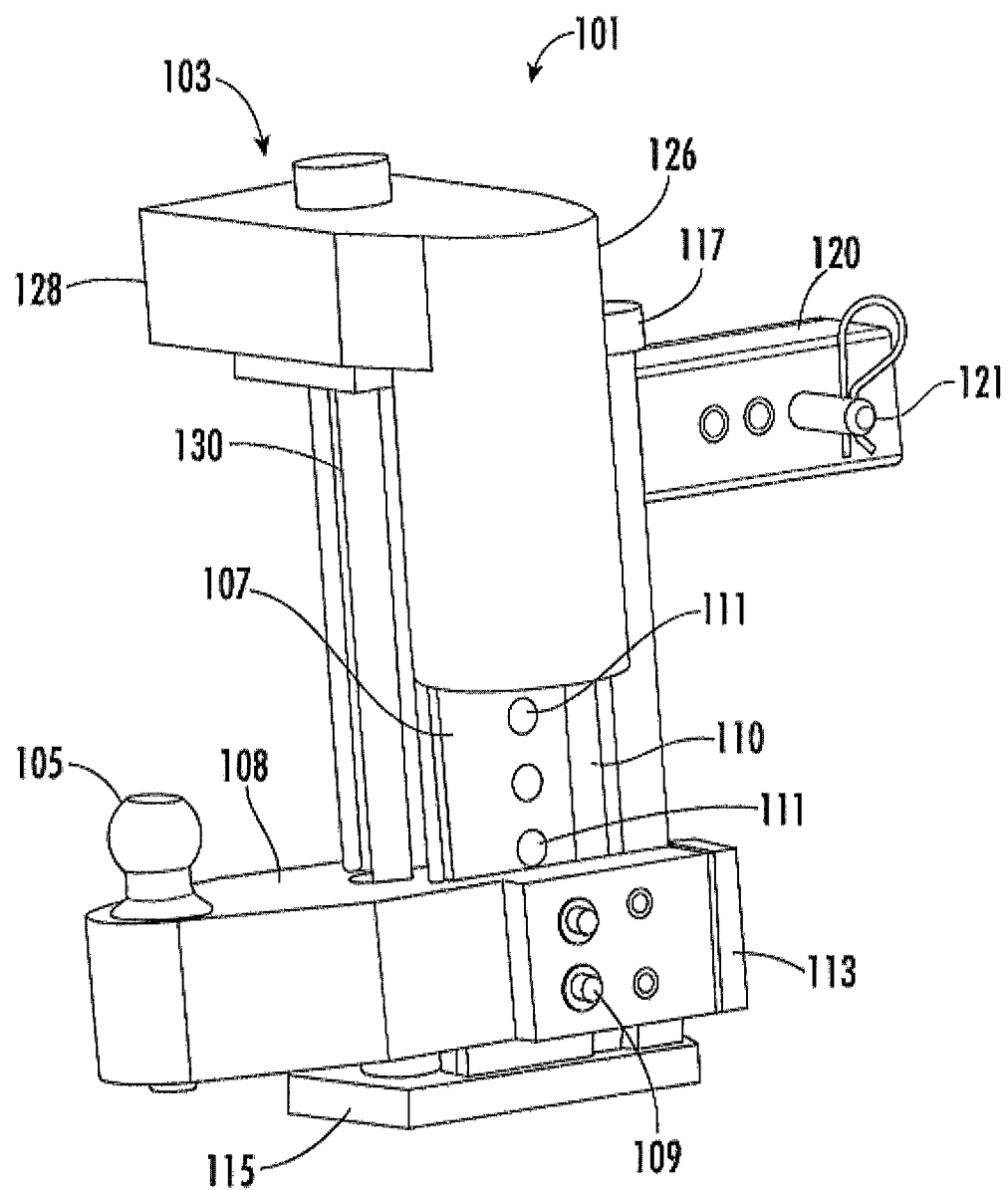
FIG. 1 is a perspective view of a trailer hitch with lift mechanism according to a preferred embodiment of the present application.

While the assembly and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined herein.

DETAILED DESCRIPTION OF THE PREFERRED EMBODIMENT

Illustrative embodiments of the trailer hitch with lift mechanism according to the present application are provided below. It will of course be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to FIG. 1 in the drawings, a trailer hitch with lift mechanism 101 according to the preferred embodiment of the present application is illustrated. Trailer hitch with lift mechanism 101 includes a motor assembly 103, an adjustable hitch base 107, a hitch locking assembly 108, and a vehicle receiver connection 120. Hitch locking assembly 108 includes an aperture 104 for interchangeably receiving a threaded hitch ball 105, an adjustment locking device 109, and a backing plate 113. Adjustable hitch base 107 includes a guide track 110, a hitch base plate 115 and a motor mount 117. Vehicle receiver connection 120 includes a receiver locking pin 121.

According to the preferred embodiment, adjustable hitch base 107 will allow for between seven and nine inches of adjustment on the height of hitch locking assembly 108 and ball 105. It will be appreciated that this size may be adjusted to meet the desired needs of various vehicles and towing equipment. Adjustable hitch base 107 may include limit switches that can automatically detect when a predetermined height is reached, and can send a signal to motor assembly 103 to start and/or stop the movement of hitch locking assembly 108 and hold hitch locking assembly 108 in place. It should be appreciated that the motion of hitch locking assembly 108 can be actuated in a variety of ways, including electronically, hydraulically, and/or pneumatically. Adjustable hitch base 107 includes a plurality of apertures 111 which are configured to receive one or more locking pins, so as to maintain the height of hitch locking assembly 108 relative to adjustable hitch base 107. In the preferred embodiment, adjustment locking device 109 is one or more locking pins, and may be a dual-pin locking pin. When a desired height is reached, adjustment locking device 109 is secured into one or more of the plurality of apertures 111, thereby locking ball 105 at a desired height. It will be appreciated that adjustment locking device may also be automatically actuated by electric, hydraulic, and/or pneumatic control devices and/or actuators.

In the preferred embodiment, motor assembly 103 is powered from a connection to a seven-way plug on the towing vehicle. Of course, a four-way plug on the towing vehicle may also be used to provide power to motor assembly 103. However, other power sources may be used in alternative embodiments, including one or more batteries, electrical generators, hydraulic systems, and/or pneumatic systems. Motor assembly 103 may be connected to a control device, such that motor assembly 103 can be controlled wirelessly. Wireless control can be achieved using a variety of devices, such as a remote control or a smartphone, or a control system carried by the towing vehicle. In case of wireless connection failure, the trailer hitch 101 may be controlled manually, as well. Because motor assembly 103 is powered from a seven-way plug under the preferred embodiment, an optional adapter may be included, that allows for additional connections, such as trailers, to be made to the seven-way plug.

Figure 4:
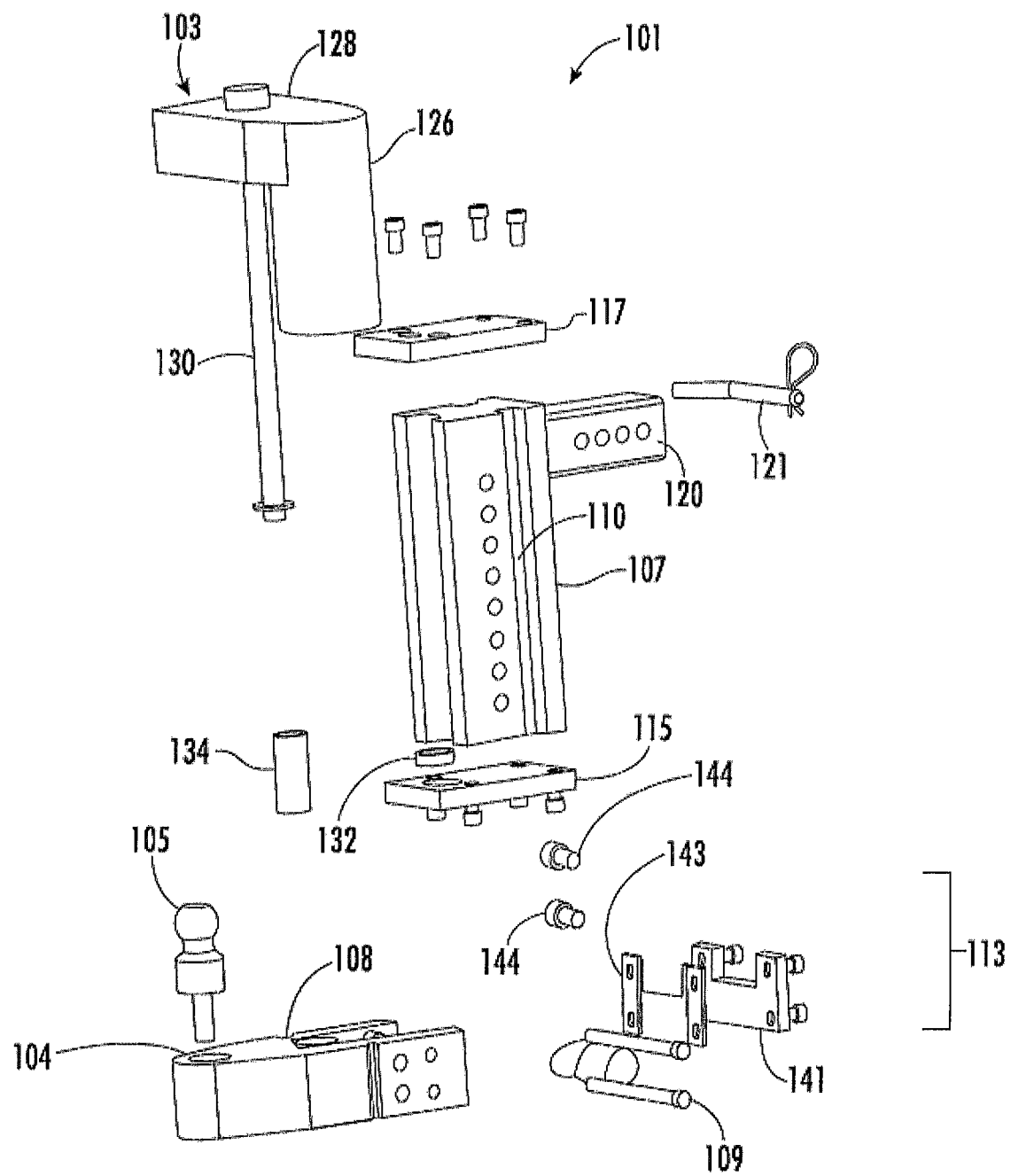
FIG. 4 is an exploded view of a trailer hitch with lift mechanism according to a preferred embodiment of the present application.

Motor assembly 103 includes a drive motor 126, a gear box 128, a drive shaft 130, a thrust bearing 132, and a drive nut or drive bushing 134 (see FIG. 4). Drive shaft 130 is preferably an ACME screw, but may also be a ball screw. In either embodiment, one or more lubrication ports may be used to apply lubricant at drive nut 134 and other locations to reduce friction and wear. Drive bushing 134 is preferably made of brass and is fastened to hitch locking assembly 108, such that rotation of drive shaft 130 causes hitch locking assembly 108 to move up and down along drive shaft 130. Drive shaft 130 bears against and is aligned by thrust bearing 132. Thrust bearing 132 is carried by hitch base plate 115. Motor assembly 103 drives drive shaft 130, which moves hitch locking assembly 108 to position ball 105 at a desired height.

In the preferred embodiment, backing plate 113 includes a back plate member 141 and a backing plate guide surface 143. Backing plate guide surface 143 is preferably made of made of an Ultra High Molecular Weight (UHMW) polyethylene or nylon material to reduce friction and allow for smooth movement of hitch locking assembly 108 along adjustable hitch base 107. Hitch locking assembly 108 also includes one or more rollers 144 (see FIG. 4), preferably two on each side of hitch locking assembly 108, that roll within guide tracks 110 of adjustable hitch base 107 to align and guide hitch lock assembly 108 relative to adjustable hitch base 107. It will be appreciated that movement along adjustable hitch base 107 may be controlled using other methods, such as ball bearings, roller disks, and other alignment devices.

Figure 2:
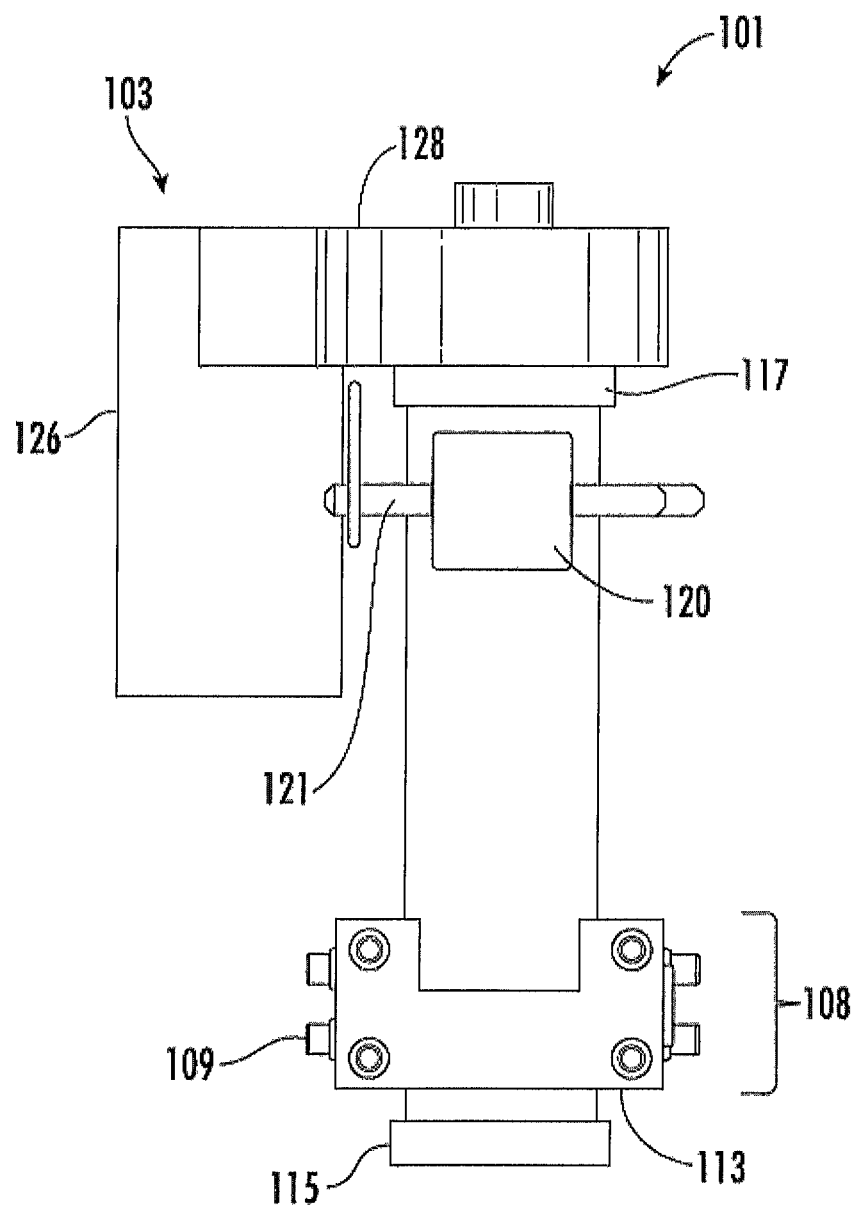
FIG. 2 is a rear view of a trailer hitch with lift mechanism according to a preferred embodiment of the present application.

Referring now also to FIG. 2 in the drawings, a rear view of trailer hitch with lift mechanism 101 is illustrated. The "rear view" is the view from the perspective of the vehicle looking towards the trailer hitch. FIG. 2 best illustrates the locking device 109 of the preferred embodiment. Under the preferred embodiment, locking pins are used for locking device 109. It should be appreciated that locking device 109 can be designed such that the pins may be inserted from one single side, or from both sides.

Figure 3:
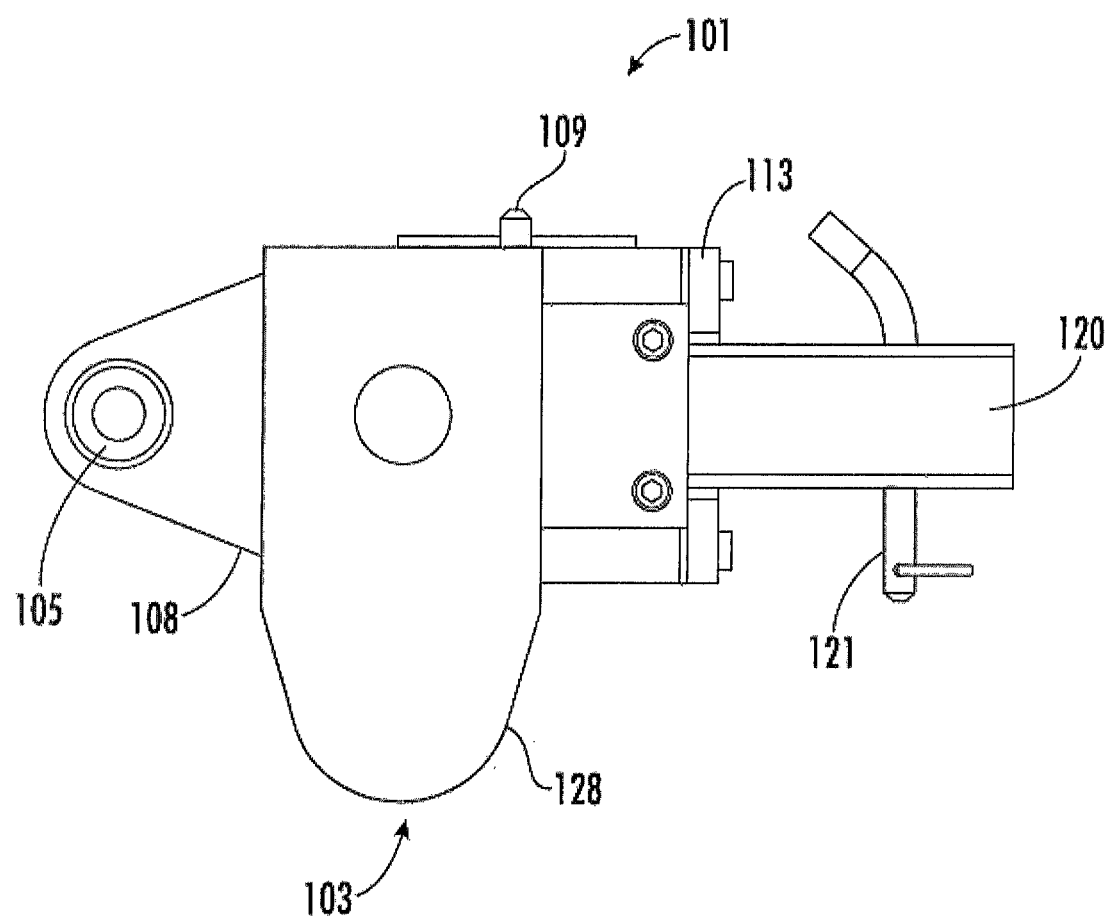
FIG. 3 is a top view of a trailer hitch with lift mechanism according to a preferred embodiment of the present application.

Referring now also to FIG. 3 in the drawings, a top view of trailer hitch with lift mechanism 101 is illustrated. FIG. 3 best illustrates the overall size and shape of the preferred embodiment of trailer hitch with lift mechanism 101. Hitch locking assembly 108 is shown having a rounded shape on the end closest to threaded hitch ball 105. It should be appreciated that this shape may change depending on the desired connection to a trailer. Additionally, it should be appreciated that additional features may be added on to hitch locking assembly 108, such as a camera for easier visibility while lining up a vehicle to a trailer. Such a camera could also be mounted on other areas of trailer hitch with lift mechanism 101, depending on desired sight lines.

Referring now also to FIG. 4 in the drawings, an exploded view of the preferred embodiment of the trailer hitch with lift mechanism 101 of the present application is illustrated. FIG. 4 best illustrates the individual element shapes of the preferred embodiment, as well as the fasteners and bearings used to connect them. It should be appreciated that a variety of connections may be made beyond those illustrated in FIG. 4, such as adding additional fasteners, bearings, or bolts.

Figure 5:
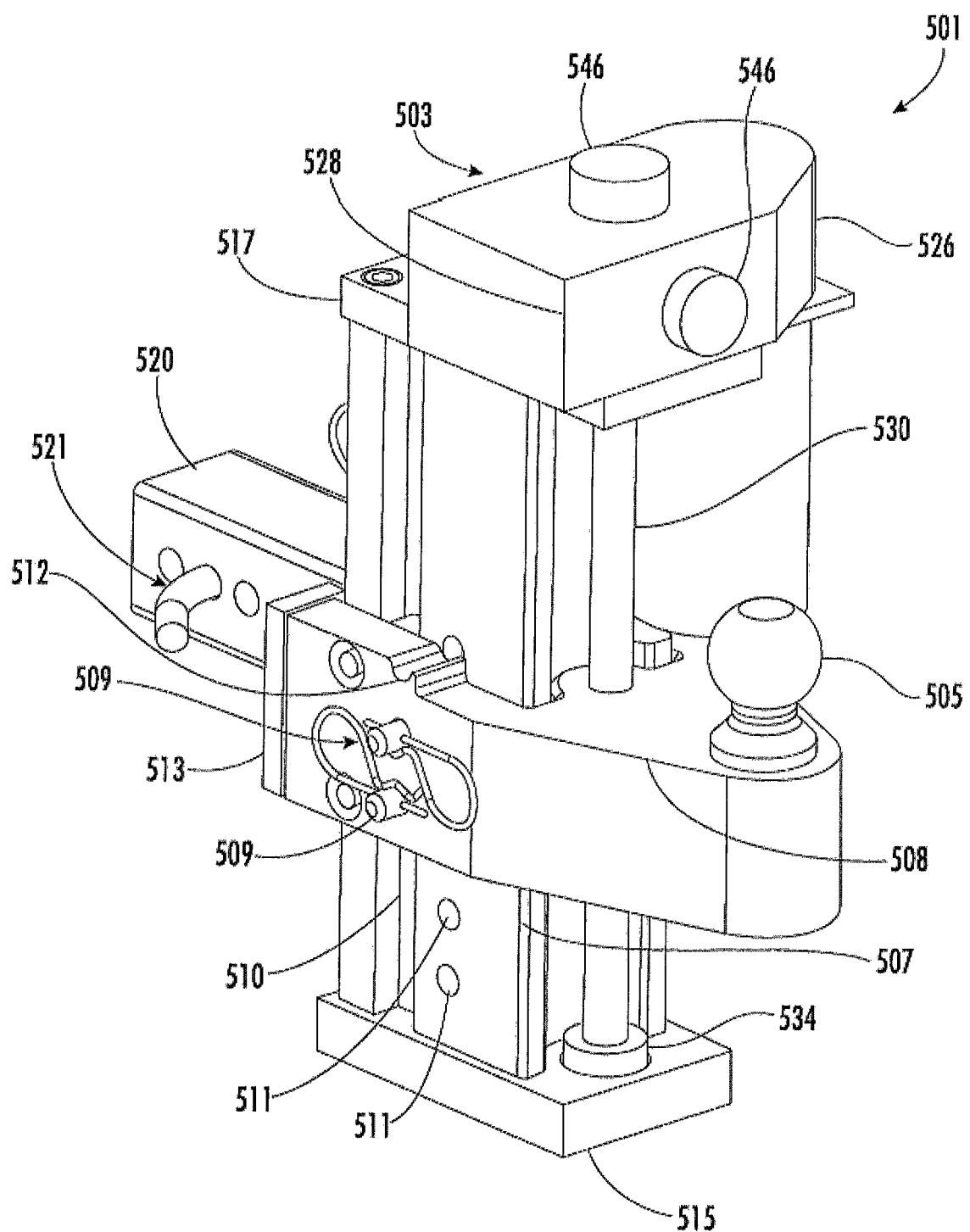
FIG. 5 is a perspective view of a trailer hitch with lift mechanism according to an alternative embodiment of the present application.

Referring now also to FIG. 5 in the drawings, a trailer hitch with lift mechanism 501 according to an alternative embodiment of the present application is illustrated. Trailer hitch 501 preferably includes a motor assembly 503, an adjustable hitch base 507, a hitch locking assembly 508, and a vehicle receiver connection 520. Hitch locking assembly 508 includes an aperture (not shown) that is similar to aperture 104 for interchangeably receiving a threaded hitch ball 505. Hitch locking assembly 508 further includes an adjustment locking device 509, pin rest 512, and a backing plate 513. Adjustable hitch base 507 includes a guide track 510, a plurality of apertures 511, a hitch base plate 515, and a motor mount 517. Apertures 511 are configured to receive one or more locking pins, so as to maintain the height of hitch locking assembly 508 relative to adjustable hitch base 507. Pin rest 512 is configured such that the locking pins may be placed on them while removed from the apertures. It should be appreciated that the pin rest 512 is an optional feature that may or may not be present on any embodiment of the present invention.

Figure 7A:
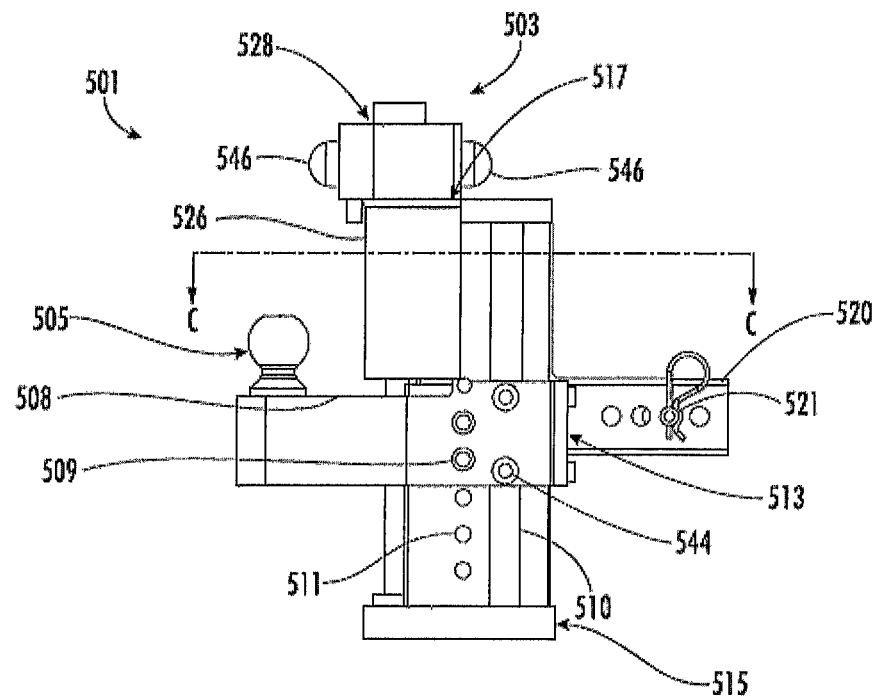
FIG. 7A is a side view of a trailer hitch with lift mechanism according to an alternative embodiment of the present application.

Under the alternative embodiment, adjustable hitch base 507 includes six apertures 511, allowing for four different height levels to meet the needs of various vehicles and towing equipment, as well as one aperture at the top, not used as a mounting location (see FIG. 7A). It should be appreciated that other alternative embodiments may use fewer or additional apertures, or may even include a different number of locking pins, which would then result in a different number of locking locations. Adjustable hitch base 507 may include limit switches that can automatically detect when a predetermined height is reached, and can send a signal to motor assembly 503 to start and/or stop the movement of hitch locking assembly 508 and hold hitch locking assembly 508 in place. It should be appreciated that the motion of hitch locking assembly 508 can be actuated in a variety of ways, including electronically, hydraulically, and/or pneumatically. When a desired height is reached, adjustment locking device 509 is secured into one or more of the plurality of apertures 511, thereby locking ball 505 at a desired height. It will be appreciated that adjustment locking device may also be automatically actuated by electric, hydraulic, and/or pneumatic control devices and/or actuators.

Similar to the preferred embodiment, the alternative embodiment motor assembly 503 is powered from a connection to a seven-way plug on the towing vehicle. Of course, a four-way plug on the towing vehicle may also be used to provide power to motor assembly 503. However, other power sources may be used in alternative embodiments, including one or more batteries, electrical generators, hydraulic systems, and/or pneumatic systems. Motor assembly 503 may be connected to a control device, such that motor assembly 503 can be controlled wirelessly. Wireless control can be achieved using a variety of devices, such as a remote control or a smartphone, or a control system carried by the towing vehicle. In case of wireless connection failure, the trailer hitch 501 may be controlled manually, as well. Because motor assembly 503 is powered from a seven-way plug under the alternative embodiment, an optional adapter may be included, that allows for additional connections, such as trailers, to be made to the seven-way plug. Trailer hitch 501 also includes plugs 546 that are designed as placeholders for additional optional features. Plugs 546 may be replaced with any additional desired feature such as a Bluetooth device, a camera, additional plugs/connection points, or numerous other devices in alternative embodiments of the present invention. A camera or multiple cameras could be added to the present invention in alternative embodiments, with multiple viewpoints, so as to aid the user of the present invention in alignment of the trailer hitch. While plugs 546 provide one example location of the above described devices, it should be appreciated that the devices may be attached in various other locations on trailer hitch 501 to achieve a more desirable appearance or functionality.

Figure 6A:
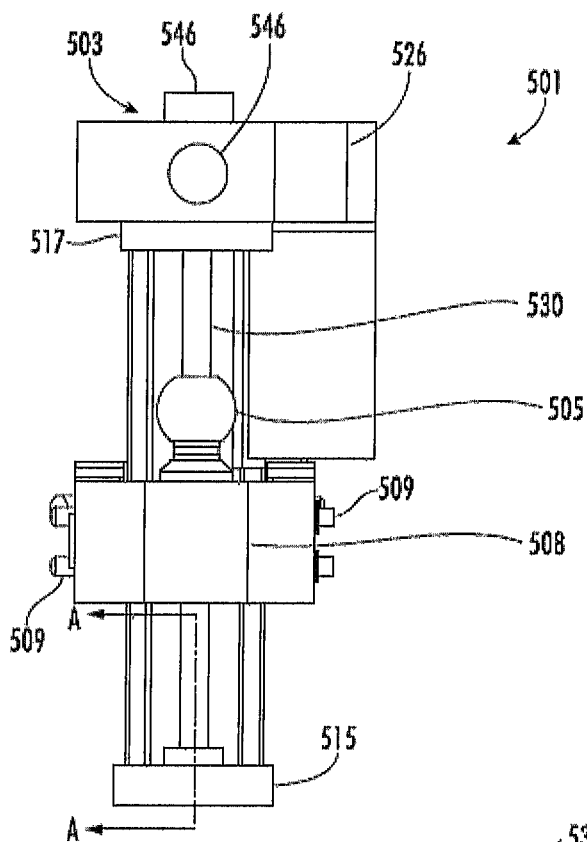
FIG. 6A is a front view of a trailer hitch with lift mechanism according to an alternative embodiment of the present application.
Figure 6B:
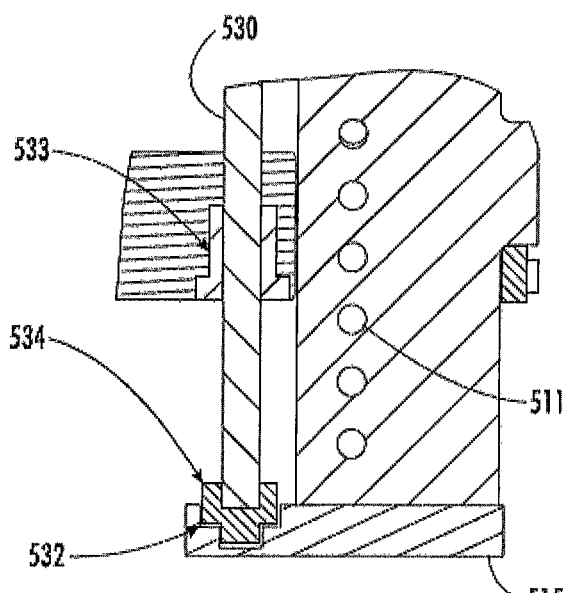
FIG. 6B is a cross sectional view of a trailer hitch with lift mechanism taken at point A-A of FIG. 6A.

Motor assembly 503 includes a drive motor 526, a gear box 528, a drive shaft 530, a thrust bushing 532, bushing 533, and a load sleeve 534 (see FIG. 6B). Drive shaft 530 is preferably an ACME screw, but may also be a ball screw. In any embodiment, one or more lubrication ports may be used to apply lubricant at sleeve 534, bushing 532/533, and other locations to reduce friction and wear. Bushing 534 is preferably made of brass and is fastened to hitch locking assembly 508, such that rotation of drive shaft 530 causes hitch locking assembly 508 to move up and down along drive shaft 530. Drive shaft 530 bears against and is aligned by thrust bushing 532. Thrust bushing 532 is carried by hitch base plate 515. Motor assembly 503 drives drive shaft 530, which moves hitch locking assembly 508 to position ball 505 at a desired height.

In the preferred embodiment, backing plate 513 includes a back plate member and a backing plate guide surface (not shown), similar to backing plate 113. Backing plate guide surface is preferably made of made of an Ultra High Molecular Weight (UHMW) polyethylene or nylon material to reduce friction and allow for smooth movement of hitch locking assembly 508 along adjustable hitch base 507. Hitch locking assembly 508 also includes one or more rollers 544 (see FIG. 9), preferably two on each side of hitch locking assembly 508, that roll within guide tracks 510 of adjustable hitch base 507 to align and guide hitch lock assembly 508 relative to adjustable hitch base 507. It will be appreciated that movement along adjustable hitch base 507 may be controlled using other methods, such as ball bearings, roller disks, and other alignment devices.

Referring now also to FIGS. 6A-6B in the drawings, additional views of the trailer hitch 501 are illustrated. FIG. 6A illustrates a front view of the trailer hitch 501. The "front view" is the view from the perspective of behind the trailer hitch looking towards the vehicle. FIG. 6A best illustrates an example positioning of trailer hitch 501 while locking device 509 is secured by the associated pins in a desired location. It should be appreciated that locking device 509 may be configured such that pins, or other locking devices, may be inserted from a single side or from both sides. FIG. 6B is a cross-sectional view, taken at point A-A of FIG. 6A. FIG. 6B best illustrates the positioning of drive shaft 530 and the components used in conjunction with drive shaft 530, such as bushing 532/533 and sleeve 534.

Figure 7B:
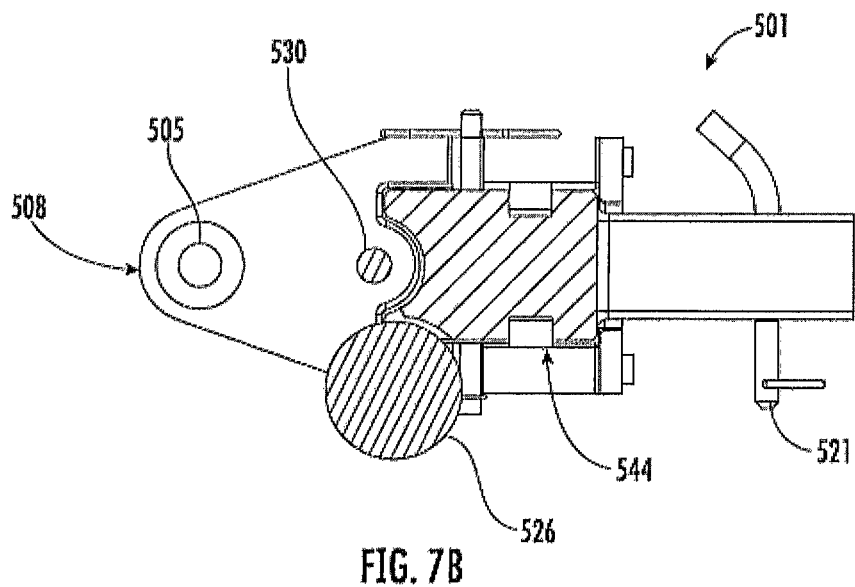
FIG. 7B is a cross sectional view of a trailer hitch with lift mechanism taken at point C-C of FIG. 7A.
Figure 8:
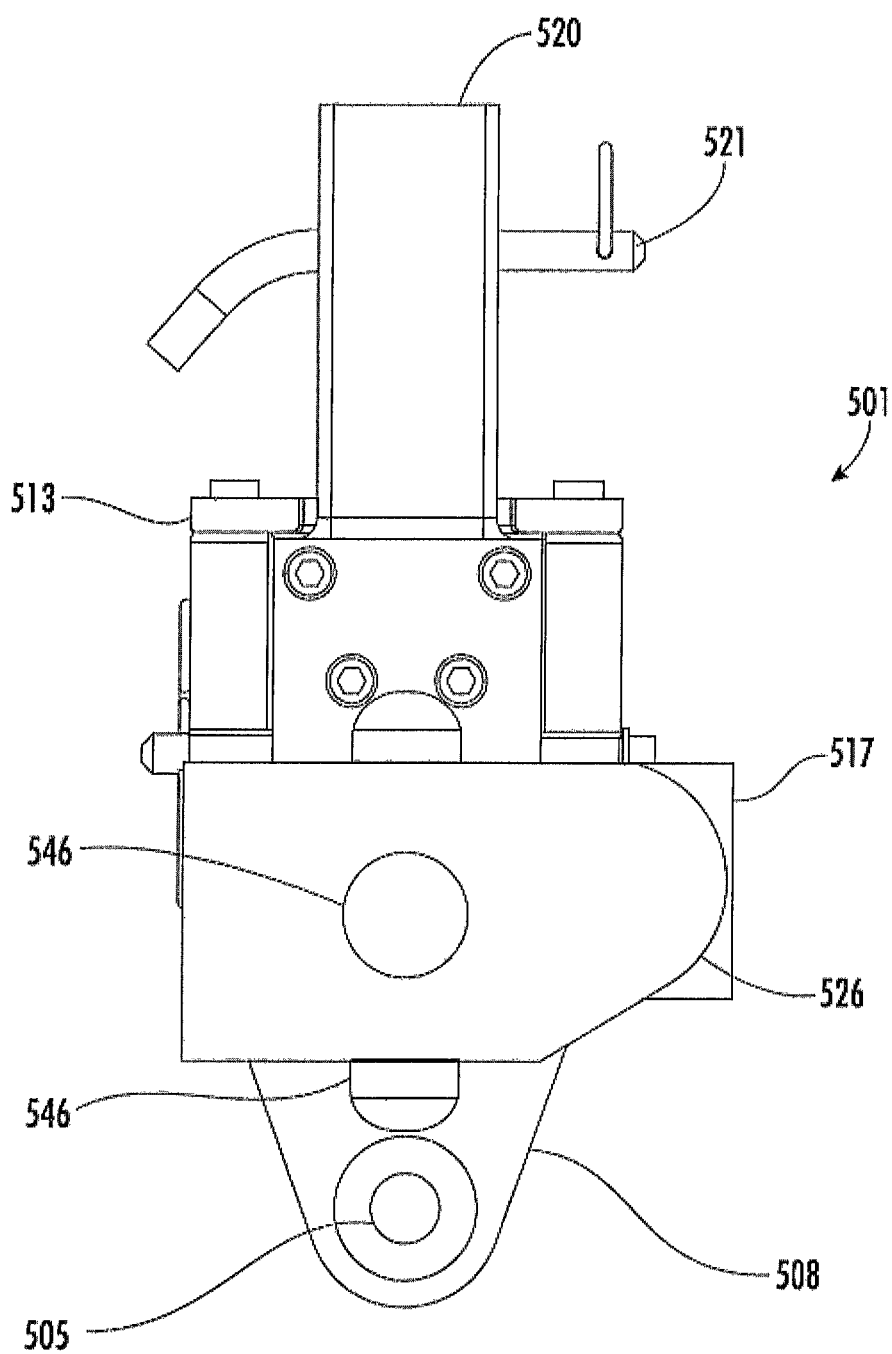
FIG. 8 is a top view of a trailer hitch with lift mechanism according to an alternative embodiment of the present application.

Referring now also to FIGS. 7A-8 in the drawings, additional views of the trailer hitch 501 are illustrated. FIG. 7A is a side view of trailer hitch 501, which best illustrates the overall shape and dimensions of the present embodiment of trailer hitch 501. FIG. 7A best illustrates the spacing of apertures 511, which provide the potential mounting locations of hitch lock assembly 508. FIG. 7B is a cross sectional view of trailer hitch 501, taken at point C-C of FIG. 7A. FIG. 7B best illustrates the overall size and shape of the preferred embodiment of trailer hitch with 501 from a top perspective. Hitch locking assembly 508 is shown having a rounded shape on the end closest to threaded hitch ball 505. It should be appreciated that this shape may change depending on the desired connection to a trailer. FIG. 8 best illustrates a similar top perspective of the features of the present invention, without making the cut illustrated by the cross-sectional view of FIG. 7B.

Figure 9:
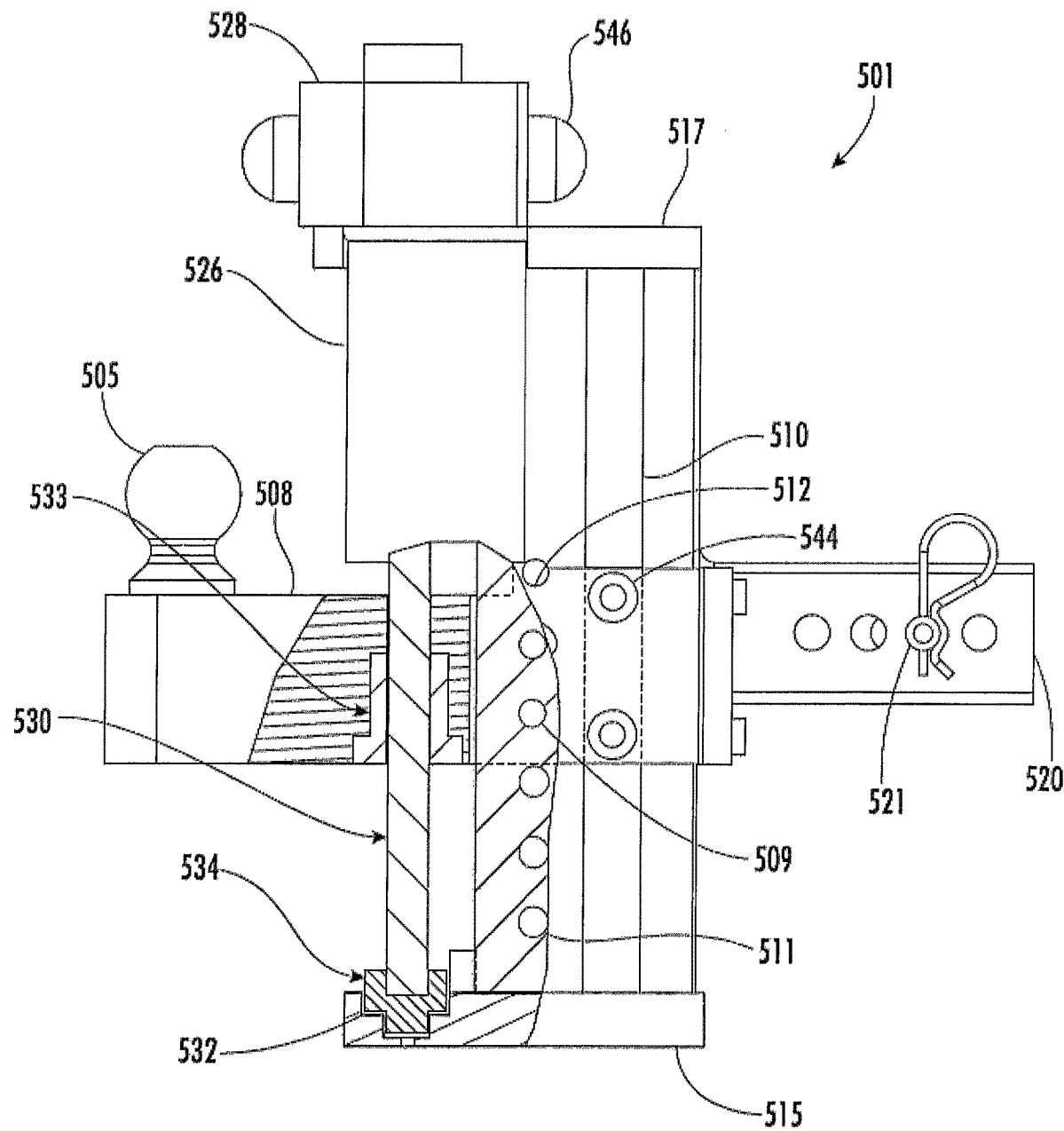
FIG. 9 is a side view with a partial cut out view of a trailer hitch with lift mechanism according to an alternative embodiment of the present application.

Referring now also to FIG. 9 in the drawings, a partial cut out view of the trailer hitch 501 is illustrated. FIG. 9 best illustrates the side view of the trailer hitch 501, while also integrating the detail of FIG. 6B to further illustrate the embodiment being described in this application. FIG. 9 best illustrates rollers 544, and how the rollers 544 are seated within guide tracks 510. As described above, it should be appreciated that alternative devices to rollers 544 may be used while still maintaining the functionality illustrated here.

Figure 10:
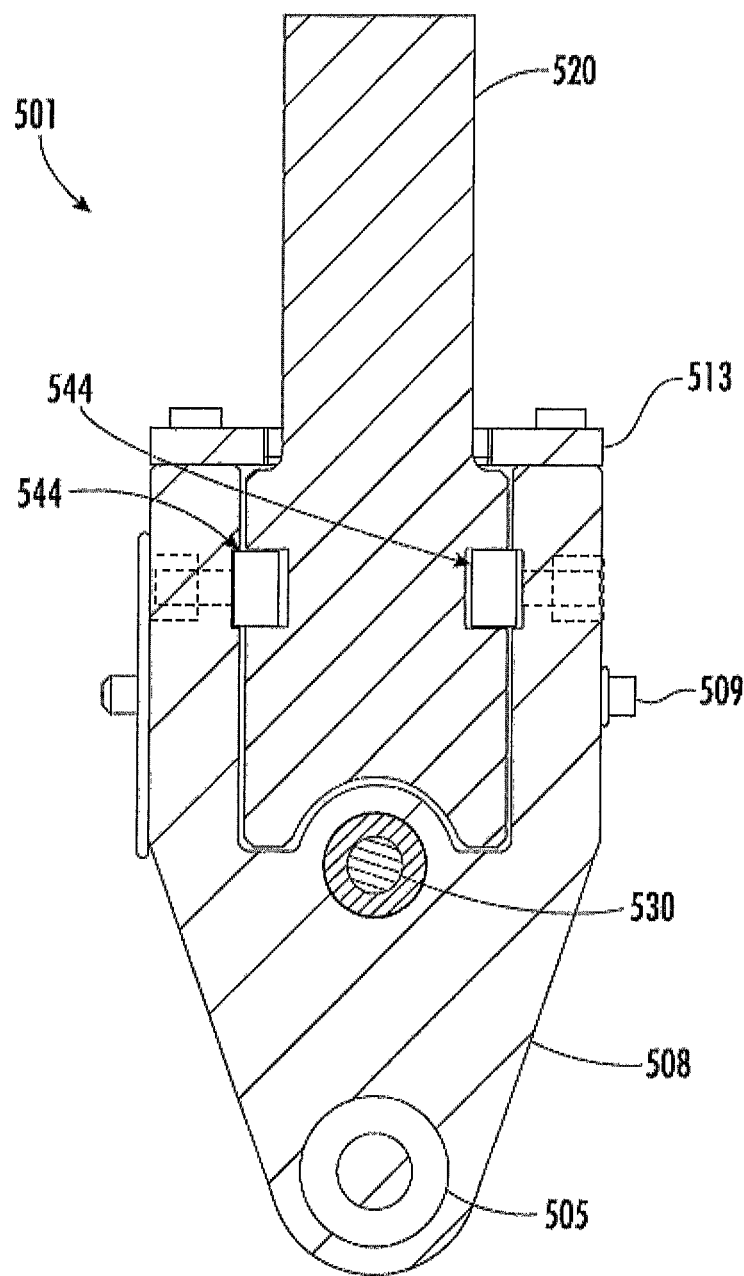
FIG. 10 is a cross sectional view of a trailer hitch with lift mechanism according to an alternative embodiment of the present application.

Referring now also to FIG. 10 in the drawings, a cross sectional view of trailer hitch 501 is illustrated. FIG. 10 best illustrates a top view perspective taken from the interior of the trailer hitch 501. As such, FIG. 10 best allows for the interior layout to be seen, specifically the seating of rollers 544 and the positioning of drive shaft 530 relative to the other components present. Similarly discussed above, it should be appreciated that alternative embodiments may have modified shapes and sizing to allow for integration with a multitude of vehicles and devices.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

I claim:

1. A trailer hitch with lifting mechanism for connection to a vehicle, the trailer hitch lifting mechanism comprising:
 a vehicle receiver connection configured for connection to the vehicle;
 an adjustable hitch base connected to the vehicle receiver connection, the adjustable hitch base comprising:
  a plurality of adjustment apertures; and
  one or more guide tracks;
 a hitch locking assembly slidingly coupled to the adjustable hitch base, the hitch locking assembly comprising:
  one or more guide rollers slidingly associated with the guide tracks;
  a backing plate;
  an aperture configured to receive a ball; and
  one or more adjustment locking devices; and
 a motor assembly carried by the adjustable hitch base, the motor assembly comprising:
  a motor;
  a drive shaft coupled to the motor; and
  a drive nut coupled to the hitch locking assembly;

wherein rotation of the drive shaft causes the hitch locking assembly to move relative to the adjustable hitch base.

2. The trailer hitch with lifting mechanism according to claim 1, wherein the backing plate has a surface made of Ultra High Molecular Weight polyethylene material.

3. The trailer hitch with lifting mechanism according to claim 1, wherein the motor is powered via a trailer hitch plug of the vehicle.

4. The trailer hitch with lifting mechanism according to claim 1, wherein the motor is operated wirelessly.

5. The trailer hitch with lifting mechanism according to claim 1, further comprising:
   a camera.

\* \* \* \* \*